US008776715B2

(12) United States Patent
Carrette (10) Patent No.: US 8,776,715 B2
(45) Date of Patent: Jul. 15, 2014

(54) MARKER APPARATUS (75) Inventor: Paul Michael Carrette, Garretson, SD (US)

(73) Assignee: Flagshooter Holdings, LLC, Garvetson, SD (US)

(*) Notice: Subject to any disclaimer, the term of this patent is extended or adjusted under 35 U.S.C. 154(b) by 405 days.

(21) Appl. No.: 13/092,793

(22) Filed: Apr. 22, 2011

(65) Prior Publication Data
US 2011/0209657 A1 Sep. 1, 2011

Related U.S. Application Data (63) Continuation-in-part of application No. 12/435,177, filed on May 4, 2009, now Pat. No. 8,136,471.

(60) Provisional application No. 61/326,899, filed on Apr. 22, 2010.

(51) Int. Cl.
| B25B 21/00 | (2006.01) |
| B25B 23/04 | (2006.01) |
| G01C 15/02 | (2006.01) |
| F16L 1/11 | (2006.01) |
| A63C 19/06 | (2006.01) |

(52) U.S. Cl.
USPC ............... 116/209; 52/105; 81/434

(58) Field of Classification Search
USPC ............ 116/209, 173; 473/150, 490; 52/103, 52/105; 81/433, 434
See application file for complete search history.

(56) References Cited

U.S. PATENT DOCUMENTS

| 429,650 | A | * | 6/1890 | Scott ............................... 52/103 |
| 2,468,211 | A | * | 4/1949 | Kuoksa .......................... 273/459 |
| 3,267,901 | A | * | 8/1966 | Carroll ........................... 116/209 |
| 3,903,835 | A | * | 9/1975 | Carroll ......................... 248/219.2 |
| 5,003,735 | A | * | 4/1991 | Bates ............................... 52/105 |
| 5,044,303 | A | * | 9/1991 | Culver, Jr. ...................... 116/209 |
| 5,052,329 | A | * | 10/1991 | Bennett ......................... 116/209 |
| 5,501,170 | A | * | 3/1996 | Walsh ............................ 116/209 |
| 6,142,882 | A | * | 11/2000 | Anglea ........................... 473/150 |
| 6,412,235 | B1 | * | 7/2002 | Pylant ............................. 52/155 |
| 6,419,599 | B1 | * | 7/2002 | Kite ............................... 473/490 |
| 6,494,322 | B1 | * | 12/2002 | Habermehl et al. .......... 206/347 |
| 6,601,480 | B1 | | 8/2003 | Habermehl |
| 6,832,575 | B2 | | 12/2004 | Carroll, Jr. |
| 6,904,834 | B2 | * | 6/2005 | Lin ................................ 81/434 |

(Continued)

FOREIGN PATENT DOCUMENTS

| CA | 2287818 A1 * | 4/2001 | ............. A63C 19/06 |
| DE | 19547092 A1 * | 10/1996 | ............. E04H 12/22 |

(Continued)

*Primary Examiner* — Richard A Smith
(74) *Attorney, Agent, or Firm* — Etherton Law Group, LLC (57) ABSTRACT

A whisker marker system has an installation apparatus, a whisker marker, a marker strip, and a whisker fastener. The installation apparatus includes a housing and a driver shaft connected to a power driver for rotating the driver shaft. A slide body coupled to the housing moves between extended and retracted positions. The slide body has a guide channel for receiving a marker strip. The marker strip includes a series of whisker markers, each bunched together with a bunching device and attached to a threaded whisker fastener. In use, the apparatus rotates the whisker fastener until it passes through the bunching device of the whisker marker. The fastener is driven into the ground until it secures the whisker marker to the ground.

7 Claims, 7 Drawing Sheets

(56) References Cited

U.S. PATENT DOCUMENTS

| | | | |
|---|---|---|---|
| 7,081,820 B2 * | 7/2006 | Minarovic | 340/572.8 |
| 7,082,857 B1 * | 8/2006 | Hoffman | 81/57.16 |
| 7,631,447 B2 * | 12/2009 | Morton et al. | 40/607.05 |
| 7,685,961 B2 * | 3/2010 | Truax | 116/209 |
| 8,136,471 B1 * | 3/2012 | Carrette | 116/209 |
| 2007/0186491 A1 * | 8/2007 | Smeed et al. | 52/105 |

FOREIGN PATENT DOCUMENTS

| | | | | |
|---|---|---|---|---|
| JP | 2004215790 A | * | 8/2004 | A63C 19/06 |
| JP | 2006118336 A | * | 5/2006 | E02D 5/56 |
| JP | 3165918 U | * | 2/2011 | G01C 15/04 |
| WO | WO 9319447 A1 | * | 9/1993 | G01C 15/04 |
| WO | WO 9512441 A1 | * | 5/1995 | A63C 19/06 |

* cited by examiner

MARKER APPARATUS

CROSS-REFERENCE TO RELATED APPLICATIONS

The present application claims the priority of U.S. Provisional Application Ser. No. 61/326,912 entitled "WHISKER MARKER SYSTEM, APPARATUS AND METHOD" which was filed Apr. 22, 2010, and is incorporated by reference.

TECHNICAL FIELD

The subject disclosure relates to ground marking systems adapted to be driven into a surrounding terrain, and more particularly to a new marker for marking a ground surface to, for example, indicate the presence of buried utilities, boundaries, events, advertising, etc. in a highly efficient and convenient manner.

BACKGROUND

By way of background concerning some conventional systems, it can be desirable to mark the ground surface to indicate, for example, the presence of underground utilities, the location of lot boundaries, and the like. This marking is often accomplished by the insertion of markers into the ground that extend upward from the ground surface and may include a flag at the top end. In other cases, the markers may comprise a plurality of nylon (or similar) strands with a nail in the center (e.g., whisker markers), so that when the nail is inserted, the marker remains at the surface of the ground. Numerous markers may be placed at spaced locations along the path of the buried utility line, and this may be true of each buried utility service (such as electric, gas, telephone, water, sewer).

Whisker markers (e.g., grading stakes) are one type of marker device commonly used in a variety of building and construction industries. Grading stakes are typically used to indicate the level to which the surrounding terrain must be graded. The stakes are customarily driven to a specified level relative to the existing surface and frequently include a brightly painted top to indicate the existence of the stake top and the level to which the surface ground is to be cut or filled. Other typical uses in the construction industries include topographic surveys of the site to be used in the preparation of plans for a structure and locating in the soil a system of stakes or other markers both in plan and in elevation from which the construction crew can take measurements of earthwork and other measurements for the proper construction of structures. Additionally, temporary stakes or other markers are usually set at the corners of proposed structures, as an approximate guide for beginning the excavation.

Generally, whisker markers (e.g., markers) are inserted into the ground surface by hand. For example, one method of inserting a single whisker marker to indicate the presence of buried electric cable involves the steps of: configuring detection equipment to detect the buried cable; detecting the buried cable with a detector; storing the detector (e.g., in a holster, on the ground surface); selecting a can of spray paint containing a paint colored to correspond to the type of utility being marked (e.g., buried electric cable); spraying paint from the selected can onto the ground surface above the buried cable's location; storing the can of spray paint; selecting a marker with characteristics that correspond to the type of utility (e.g., a marker with a visual indicator printed or colored to indicate buried electric cable); and inserting the flag into the ground surface proximate to the paint and above the buried cable's location. These methods are repeated until a desired amount (e.g., length) of the buried cable has been marked.

However, the installation of the markers carries with it a variety of deficiencies. One such deficiency conventionally associated with the installation of markers to demarcate the location of a buried object is that the process can be laborious, due to the numbers of markers that need to be placed as well as the manner in which the markers are inserted. The markers may be inserted by hand into the ground with no mechanical assistance, but this requires repeatedly bending down to engage and insert the marker into the ground surface. An alternative method, with whisker markers, may require the use of a hammer to drive the nail of the whisker marker into the ground. This repeated bending over and hammering can be physically taxing on the person performing the marking operation.

A number of devices have been proposed to facilitate the placement of markers. Another deficiency commonly associated with the installation of markers is that while these devices may work in some instances, some appear to actually make the insertion action more difficult by increasing the cross sectional profile of the portion of the marker that is being inserted into the ground (and thereby causing more resistance due to the larger profile), and/or requiring that a portion of apparatus be inserted in the ground as well. This approach can make it difficult if not impossible to insert markers into ground that is highly compacted, stony, or is even slightly frozen, to name a few of the factors making the insertion more difficult.

An even further deficiency commonly associated with the installation of marks is that some of the devices in the prior art must be loaded with a marker each time that a marker is to be installed, which requires continual reloading of the device. Also, some devices require a relatively strong and rigid marker in order to push the marker into the ground, and this may require markers with thicker cross sectional sizes in order to provide the necessary rigidity.

The above-described deficiencies of today's markers and marker systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

According to one exemplary embodiment, A whisker marker system for marking a ground surface includes an installation apparatus for installing a marker, the installation apparatus having a housing, an elongate driver shaft for operative connection to a power driver for rotating and defining a longitudinal axis. The installation apparatus further has the drive shaft and the housing coupled together for movement together parallel to the axis of the drive shaft. The driver shaft has, at the forward end, a driver bit. A slide body is coupled to the housing for movement relative to the housing and drive shaft, parallel to the axis of the drive shaft, between an extended position and a retracted position. The slide body has a guide channel for a marker strip extending through the slide body transverse to the driver and intersecting with the driver. The guide channel has an entrance for inserting the marker strip and an exit for a used marker strip to exit. A marker to be driven into a ground surface by the installation apparatus includes a whisker marker for visually marking a location on a surface. The whisker marker includes a bunch of flexible strands which form an indicator flag having a bunching device permanently attached to the flexible strand bunch at a connection point located in the longitudinal center of the flexible strand bunch. A pair of apertures located opposite each other in the bunching device receive a whisker fastener and the whisker fastener is positioned about a frustro-conical top portion of the whisker fastener. A marker strip includes threaded fasteners such as screws joined together in a strip. A whisker fastener that receives the whisker marker includes a threaded fastener. The threaded fastener has a pointed bottom portion, a threaded middle portion, and a frustro-conical top portion. The threaded fastener is attached to the marker strip such that the threaded fastener is released from the marker strip when the threaded fastener is rotated.

These and other embodiments are described in more detail below.

BRIEF DESCRIPTION OF THE DRAWINGS

The disclosure will be better understood when consideration is given to the following detailed description thereof. Such description makes reference to the annexed drawings wherein.

DESCRIPTION OF PREFERRED EMBODIMENTS

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices may be shown in block diagram form in order to facilitate describing the claimed subject matter.

Moreover, the word "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In the following detailed description of embodiments according to the present disclosure, reference is made to the accompanying drawings which form a part hereof, and in which is shown by way of illustration specific preferred embodiments in which the system of the disclosure may be practiced. These embodiments are described in sufficient detail to enable those to be understood that other embodiments may be utilized and that logical, mechanical and electrical changes may be made without departing from the spirit or scope of the disclosure. To avoid detail not necessary to enable those skilled in the art to practice the systems and methods of the disclosure, the description may omit certain information known to those skilled in the art. The following detailed description is, therefore, not to be taken in a limiting sense, and the scope of the present disclosure is defined only by the appended claims.

With reference now to the drawings, and in particular FIGS. 1 through 5 thereof, various embodiments employing the principles and concepts of the present whisker marker system generally designated by the reference number 10, will be described.

According to an embodiment, whisker markers 12, a type of marker 30 used to indicate, for example, the boundary of a roadway, are shown. Generally, whisker markers 12 are placed on a porous (e.g., compacted gravel) ground surface 14 to be marked, and secured to the ground surface 14 using a whisker fastener 16 (e.g., nail) driven through the whisker marker 12 and into the ground 13 with a hammering device. A whisker marker 12 can comprise a plurality of flexible, slender, elongated materials (e.g., extruded fibers 18a, 18b, 18c, nylon threads). The flexible fibers 18a, 18b, 18c, have a length, and are bunched together and trimmed so that the fibers in the bunch of fibers are of a uniform length. The fibers 18a, 18b, 18c, can be bent into a substantially U-shape or V-shape as they are driven into the ground 13 because of the lateral pressure directed towards the bunch of fibers at a connection point 20 to the whisker fastener 16. At about the midpoint of the length of the bunch of fibers, a bunching device 22 is used to surround the fibers so that they are retained in a bunch. Two apertures 24a and 24b, located opposite from one another and capable of receiving the whisker fastener 16, are located in the bunching device 22. In use, the whisker fastener 16 is placed in both of the apertures, and then driven into the ground 13. Because the bunching device 22 is located below the head 26 of the whisker fastener 16, the bunching device 22 and associated bunched fibers contact the ground surface 14 first, causing the fibers of the bunch to bend upwards as the head 26 of the whisker fastener 16 is forced further into the ground 13. Commonly, the height of the head 26 of the whisker fastener 16 is desired to be flush with the surface of the ground 14 so that, for example, grading equipment operators will be able to grade over the flexible fibers without contacting the head 26 of the whisker fastener 16, causing the fastener 16 to be removed from the ground surface 14.

With reference now to the drawings, and in particular FIGS. 1 through 18 thereof, various embodiments employing the principles and concepts of the present whisker marker apparatus generally designated by the reference number 10, will be described.

One embodiment of the disclosure relates to an installation apparatus 28 shown for use with a marker 30 (e.g., a whisker marker 12 mounted on a whisker fastener 16). A fastener 16 (e.g., a screw having a screwhead 16, a pointed end, and a threaded shaft positioned therebetween) is loaded into the screw-driver like apparatus in an installation position. A screw-driver like apparatus 28 of the type discussed herein in various embodiments can be found in U.S. Pat. No. 6,601,480, dated Sep. 15, 2000, which is hereby incorporated by reference. According to an embodiment, the marker installation system 10 includes a rotatable bit 32 for engaging the screwhead 16, selectively rotating the fastener 16 while remaining engaged with the screwhead 16, causing the fastener 16 to be driven into some type of surface, such a ground surface 14 or a wooden stake (not shown). The surface may include gravel or hard packed roadway material, including reground asphalt and other types of roadway. The whisker marker system and apparatus further includes a whisker marker 12 holding assembly for holding the whisker marker 12 adjacent the pointed end of the fastener 16. In use, the apparatus engages the screwhead 16, rotating the fastener 16 so that the pointed end of the threaded shaft pierces or passes through the bunching device 22 of the whisker marker 12. The fastener 16 is driven into the ground 13 (or other surface) to a desired depth, until the screwhead 16 secures the whisker marker 12 to the ground 13.

According to an embodiment, the fastener 16 may be driven into the ground 13 such that the screwhead 16 is positioned below the surface of the ground, and the whisker marker 12 extends upwards from the screwhead 16, above the surface of the ground. According to this embodiment, the whisker marker 12, which is constructed of a flexible material, is positioned so as to prevent accidental removal from passersby or from roadway equipment.

According to an embodiment, the top of the fastener 16 (or a predetermined portion of the whisker marker 12 secured by the fastener 16) may be driven into a ground surface 14 to a desired depth, so that the ground surface 14 can be graded to a particular elevation (e.g., a process sometimes referred to as "blue topping"). The elevation may be determined by the grading the surface until the top of the fastener 16 is uncovered, or until a predetermined portion of the whisker marker 12 is uncovered. According to yet another embodiment, the fastener 16 and associated whisker marker 12 may be driven into a spike of wood (e.g., inserted into a ground surface 14) to illustrate a desired elevation. The use of a whisker marker 12 permits heavy equipment operators to grade an elevation by visualizing the marker 30 from the operating cab of the equipment.

Figure 1A:
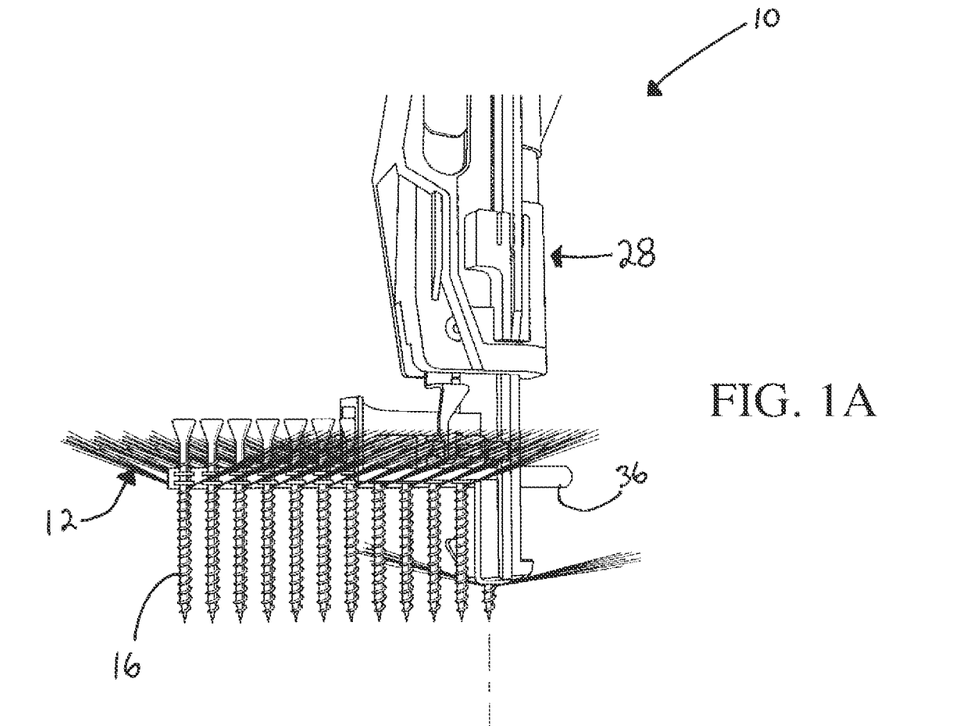
FIG. 1A through 1D are schematic side perspective views of a new whisker marker system according to the present disclosure.
Figure 1B:
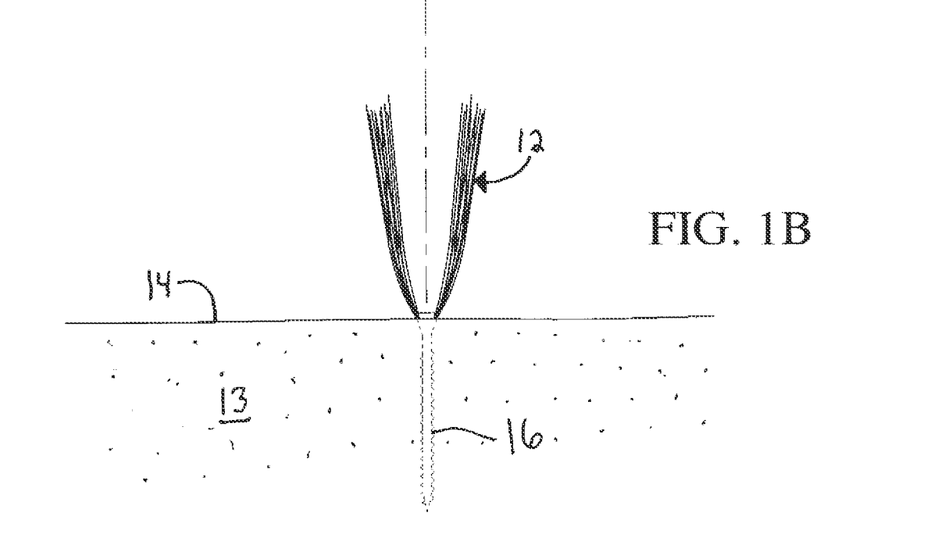
Figure 1C:
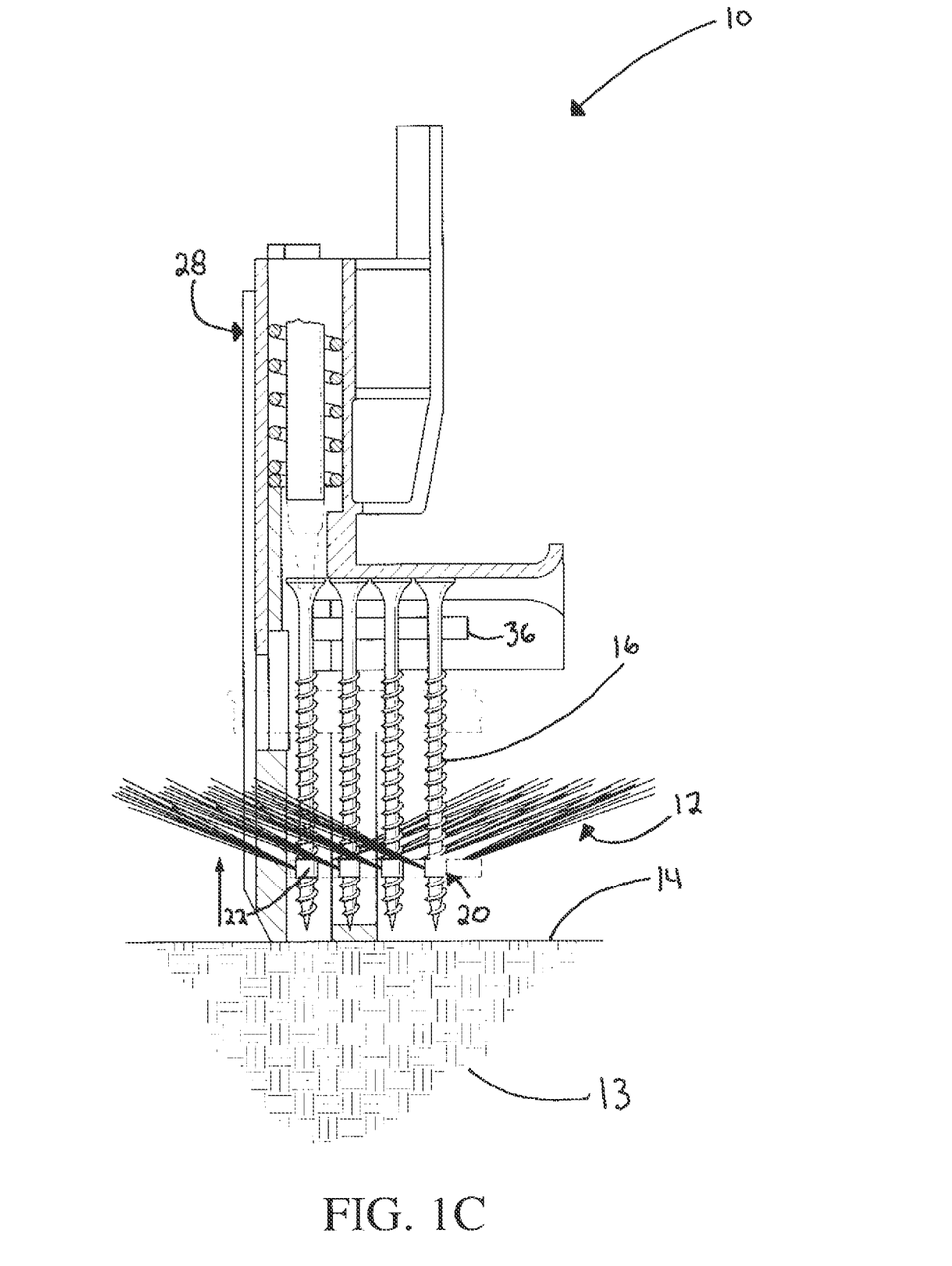
Figure 1D:
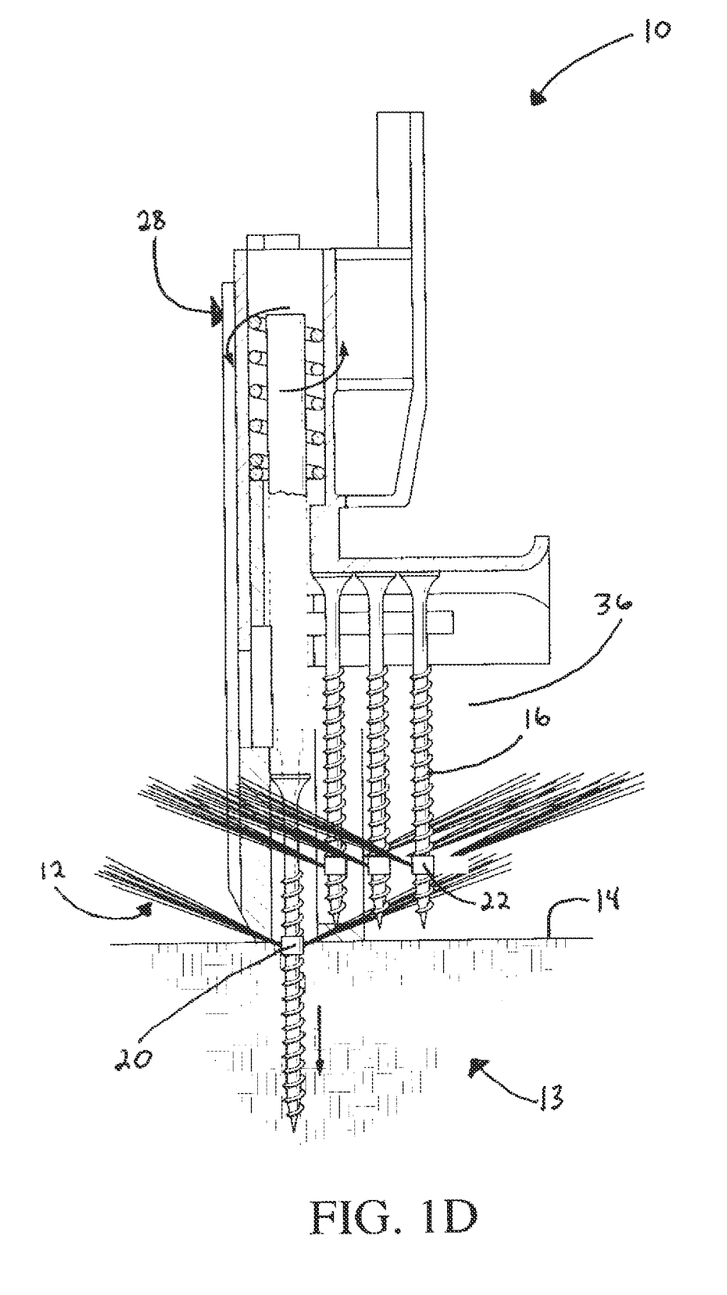
Figure 2:
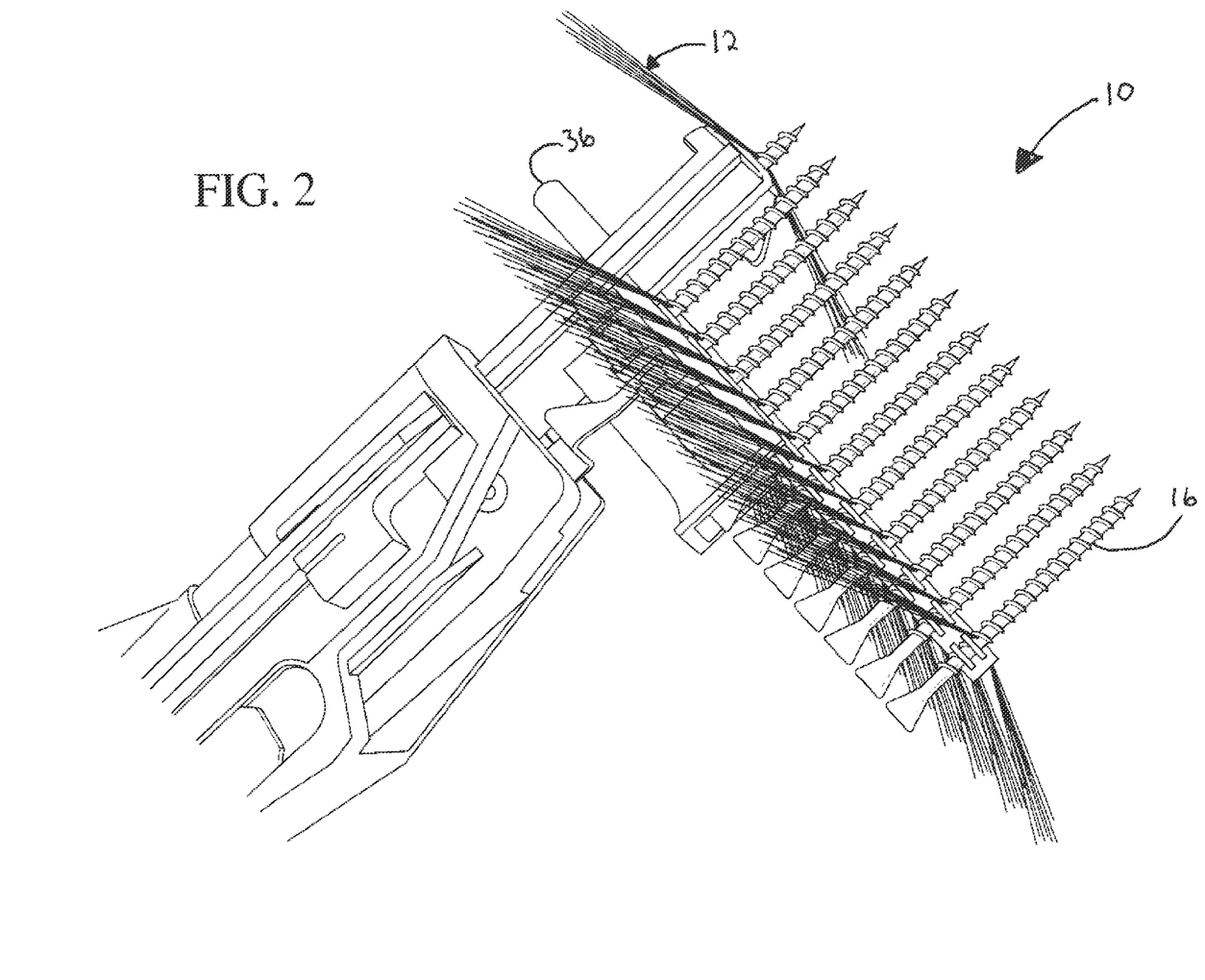
FIG. 2 is a schematic perspective view of a new whisker marker system according to the present disclosure.
Figure 3:
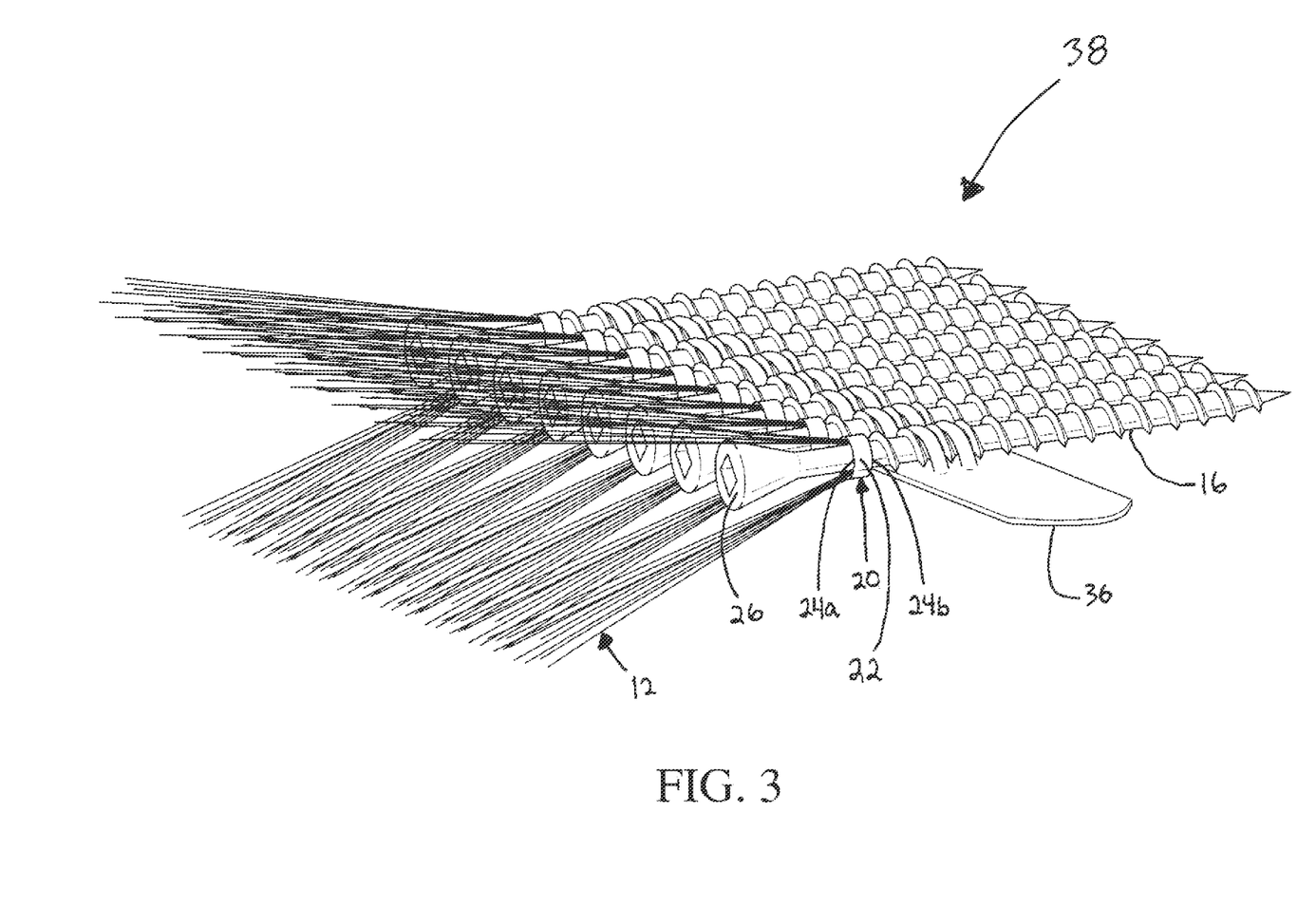
FIG. 3 is a schematic perspective view of the markers attached to a marker strip, according to the illustrative embodiment.
Figure 4:
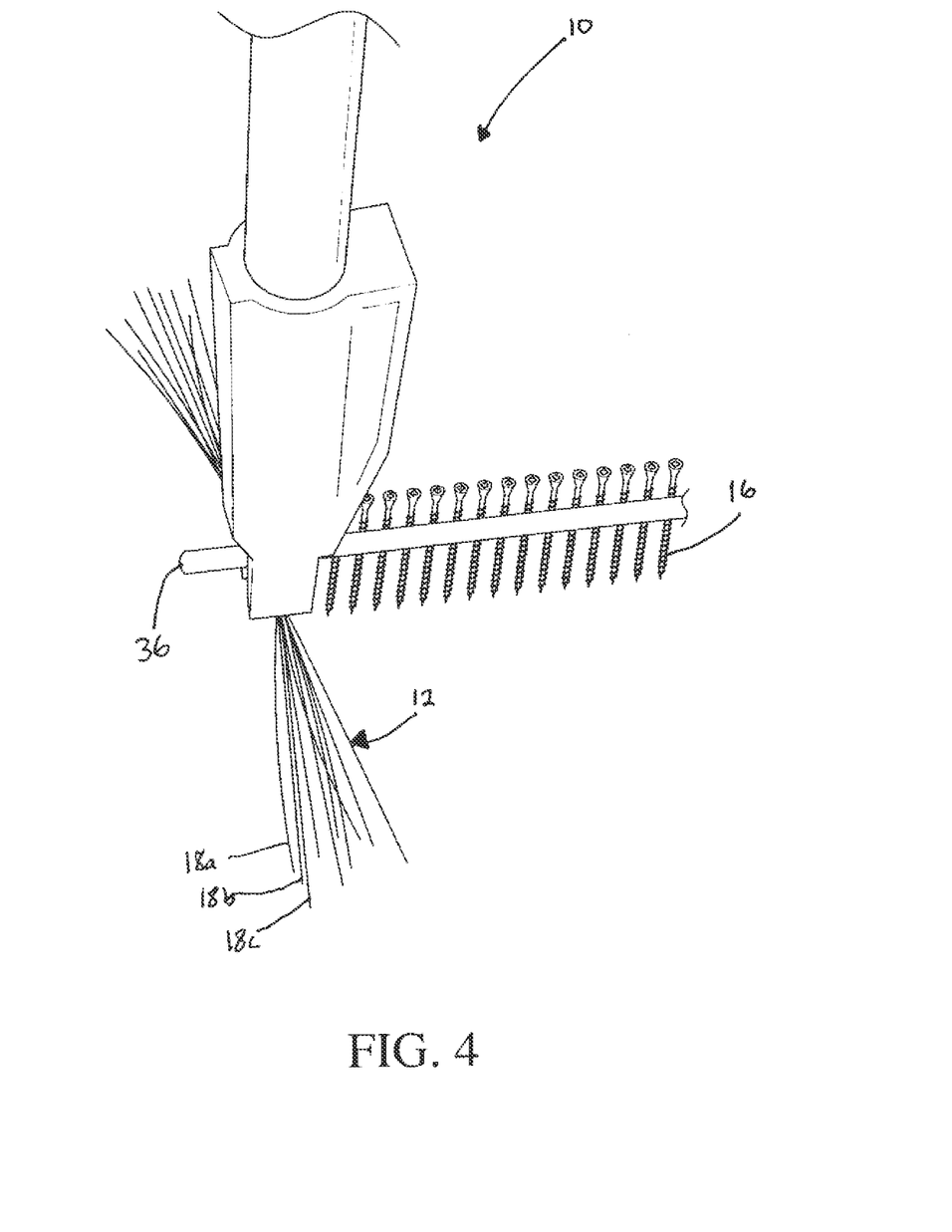
FIG. 4 is a schematic perspective view of a new whisker marker system according to the present disclosure.
Figure 5A:
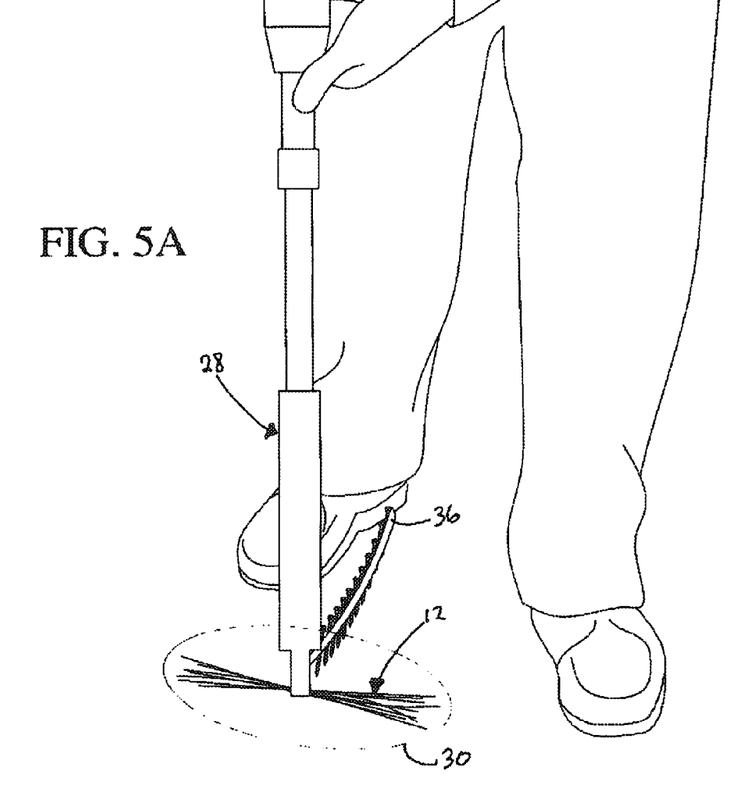
FIGS. 5A and 5B illustrates a new whisker marker method according to the present disclosure.
Figure 5B:
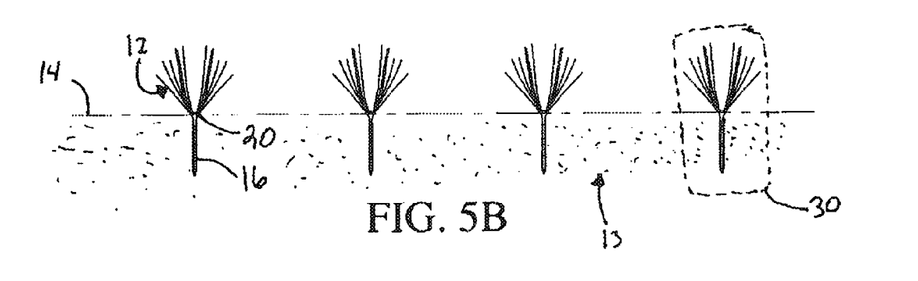

According to an embodiment as shown in FIGS. 4 and 5b, multiple whisker markers 12 can be loaded together in a side by side configuration (e.g., collated) such that the portions of the whisker markers 12 to be pierced by the pointed end of the fastener 16 are in substantially linear. The collated markers are inserted into a whisker marker 12 holding assembly configured to advance a single whisker marker 12 of the collated markers into the installation position after the previous whisker marker 12 has been secured to a surface. Accordingly, in an embodiment, multiple fasteners can be loaded together in a side-by-side configuration (e.g., collated) such that the shaft of adjacent fasteners is substantially parallel can be inserted into a fastener 16 advancing assembly that advances one fastener 16 of the collated fasteners into the installation position after the previous fastener 16 has been driven into a surface. According to this embodiment, the whisker marker 12 system and apparatus can be operated with both collated fasteners and whiskers until the supply of collated fasteners and whiskers is depleted.

According to an embodiment, a whisker marker 12 can be pre-threaded onto the pointed end of a fastener 16, or on the shaft of a fastener 16. In this configuration, only a single, pre-threaded fastener 16 is inserted into the installation position before each use of the marking apparatus. Accordingly, pre-threaded fasteners 26 can be loaded together in a side-by-side configuration (e.g., collated) such that the shaft of adjacent pre-threaded fasteners 26 are substantially parallel. A first pre-threaded fastener 16 of this collated magazine of fasteners can then be can be inserted into a fastener 16 advancing assembly configured to advance a single pre-threaded fastener 16 into the installation position at a time.

According to an embodiment, the whisker markers 12, fasteners or pre-threaded fasteners 26 (e.g., various markers) are be collated together on an outside surface by an elongated element 36. The elongated element 36 (e.g., tape, glue, cloth, integrally molded tearable strip) extends across multiple various markers such that the elongated element 36 (e.g., the whisker fastener 16) is substantially positioned perpendicularly to any one of the fasteners in collated fasteners or collated pre-threaded fasteners 38 (e.g., screwhead fasteners). For example, an adhesive may bond a portion of the shafts of adjacent fasteners together, and an adhesive would not prevent dislodgment of one fastener 16 from the other fastener 16 (or one marker 30 from another marker 30) when rotational force is applied to one of the various markers on an axis that is either parallel to a fastener 16 or pre-threaded fastener, or perpendicular to a marker 30. The various markers may be secured together in a planar arrangement that locates one or more various markers in a line. The elongated element 36 (e.g., marker strip) is designed to release one of the various markers when a rotational or other shearing force is applied to the elongated element 36 by the various markers (e.g., such as a rotational force applied by a fastener 16).

According to an embodiment, the whisker markers 12, fasteners, or pre-threaded fasteners 26 may be constructed of a variety of materials (e.g., plastic, metal, etc.) suitable for the type of surface being marked. Additionally, the whisker markers 12 can produced in any desired color.

According to an embodiment, a marker 30 is disclosed as a whisker marker 12 having a whisker fastener 16 with a cylindrical threaded shaft attached thereto. Other cross sectional shapes of the insertion portion may be employed, including rectangular, square, triangular, oval, etc. One embodiment of the disclosure relates to a marker 30 which is highly suitable for marking a dense ground surface 14 using a threaded fastener 16, although other applications of the marker 30 may be utilized for marking other objects into which a portion of the marker 30 may be inserted. The marker 30 may be utilized for temporarily (or more permanently) marking on a ground surface 14 the location of various otherwise hidden features, including the location of property boundaries, the location of utility lines buried under the ground surface 14, as well as the location of any other demarcations such as for example, game field boundaries, path boundaries or elevations (e.g., for roadway grading). The marker 30 may also have other purposes such as for providing decorative additions to a ground surface 14 or to temporarily mark a path along a ground surface 14. According to an embodiment, the marker 30 may press a non-threaded fastener 16 into the ground 13 in order to secure a whisker marker 12.

The word "exemplary" is used herein to mean serving as an example, instance, or illustration. For the avoidance of doubt, the subject matter disclosed herein is not limited by such examples. In addition, any embodiment or design described herein as "exemplary" is not necessarily to be construed as preferred or advantageous over other embodiments or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

In view of the exemplary apparatus and methods described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Embodiments of the system of the disclosure are disclosed in the description and related drawings directed to specific embodiments of the disclosure. Alternate embodiments may be devised without departing from the scope of the disclosure. Additionally, well known elements of the system of the disclosure will not be described in detail or will be omitted so as not to obscure the relevant details of the disclosure.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Moreover, in the foregoing Detailed Description, it can be seen that various features are described in the context of a single embodiment for the purpose of streamlining the disclosure. The disclosure of a single embodiment is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Further, where the term "substantially" is used, it is intended to mean "for the most part" or "being largely but not wholly that which is specified".

What is claimed is:

1. A whisker marker system for marking a ground surface comprising:
    an installation apparatus for installing a marker, the installation apparatus comprising:
    a housing;
    an elongate driver shaft for operative connection to a power driver for rotation thereby and defining a longitudinal axis, the driver shaft and the housing coupled together for movement together parallel to the axis of the drive shaft, and the driver shaft having the forward end a driver bit;
    a slide body coupled to the housing for displacement relative to the housing and drive shaft parallel to the axis of the driver shaft between an extended position and a retracted position, the slide body having a guide channel for a marker strip extending through the slide body transverse to the driver and intersecting with the driver and the guide channel having an entrance for inserting the marker strip and an exit for a used marker strip to exit; and
    a marker to be driven into a ground surface by the installation apparatus, the marker comprising:
    a whisker marker for visually marking a location on a surface, the whisker marker comprising a bunch of flexible strands which form an indicator flag;
    the flexible strand bunch having a bunching device permanently attached to the flexible strand bunch at a connection point located in the longitudinal center of the flexible strand bunch; and
    a pair of apertures located opposite each other in the bunching device to receive a whisker fastener and be positioned about a frustro-conical top portion of the whisker fastener; and
    a marker strip comprising threaded fasteners which are joined together in a strip; and
    the whisker fastener for receiving the whisker marker, the whisker fastener comprising:
        the threaded fastener, the threaded fastener having a pointed bottom portion, a threaded middle portion, and a frustro-conical top portion; and
    the threaded fastener being attached to the marker strip such that the threaded fastener is released from the marker strip when the threaded fastener is rotated.

2. The whisker marker system of claim 1 further comprising an additional flexible strand bunch located about the flexible strand bunch on the threaded fastener.

3. The whisker marker system of claim 2 wherein the flexible strand bunches are colored differently.

4. The whisker marker system of claim 1 wherein the threaded fastener is rated for screwing into solid surfaces.

5. A marker to be driven into a ground surface by an installation apparatus for visually marking a location on a surface, the marker comprising:
    a bunch of flexible strands which form an indicator flag, the flexible strand bunch having a bunching device permanently attached to the flexible strand bunch at a connection point located in the longitudinal center of the flexible strand bunch;
    a pair of apertures located opposite each other in the bunching device to receive a whisker fastener and be positioned about a frustro-conical to portion of the whisker fastener; and
    a whisker fastener for receiving the whisker marker, the whisker fastener comprising: a threaded fastener, the threaded fastener having a pointed bottom portion, a threaded middle portion, and a frustro-conical top portion;

wherein the whisker fasteners are joined together in a marker strip and wherein the threaded fastener is attached to the marker strip such that the threaded fastener is released from the marker strip when the threaded fastener is rotated.

6. A method of marking a location on a surface, the method comprising the acts of:

providing an installation apparatus for installing a marker, the installation apparatus comprising:
  a housing;
  an elongate driver shaft for operative connection to a power driver for rotation thereby and defining a longitudinal axis;
  the driver shaft and the housing coupled together for movement together parallel to the axis of the drive shaft, the driver shaft having the forward end a driver bit;
  a slide body coupled to the housing for displacement relative to the housing and drive shaft parallel to the axis of the driver shaft between an extended position and a retracted position, the slide body having a guide channel for a marker strip extending through the slide body transverse to the driver and intersecting with the driver, and the guide channel having an entrance for inserting the marker strip and an exit for a used marker strip to exit;

providing a whisker marker to be driven into a ground surface by the installation apparatus for visually marking a location on a surface, the whisker marker comprising:
  a bunch of flexible strands which form an indicator flag, the flexible strand bunch having a bunching device permanently attached to the flexible strand bunch at a connection point located in the longitudinal center of the flexible strand bunch;
  a pair of apertures located opposite each other in the bunching device to receive a whisker fastener and be positioned about a frustro-conical top portion of the whisker fastener; and
  a marker strip comprising threaded fasteners which are joined together in a strip; and providing a whisker fastener for receiving the whisker marker, the whisker fastener comprising:
  the threaded fastener, the threaded fastener having a pointed bottom portion, a threaded middle portion, and a frustro-conical top portion, the threaded fastener being attached to the marker strip such that the threaded fastener is released from the marker strip when the threaded fastener is rotated;

inserting the marker strip into the entrance of the guide channel so that a threaded fastener on the marker strip is directly below the bit of the installation apparatus;

positioning the slide body of the installation apparatus about the location to be marked; applying downward pressure to the installation apparatus; and actuating the installation apparatus such that the bit engages the threaded fastener and rotates the fastener to install the fastener and the attached whisker marker into the ground until a desired depth has been reached.

7. The method of claim 6 wherein the desired depth occurs when the top of the whisker fastener is level with the surface of the ground.

* * * * *